Sept. 15, 1925.
G. RATH
1,553,718
GAS ABSORPTION APPARATUS
Filed Oct. 15, 1924
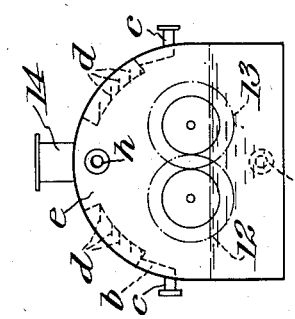
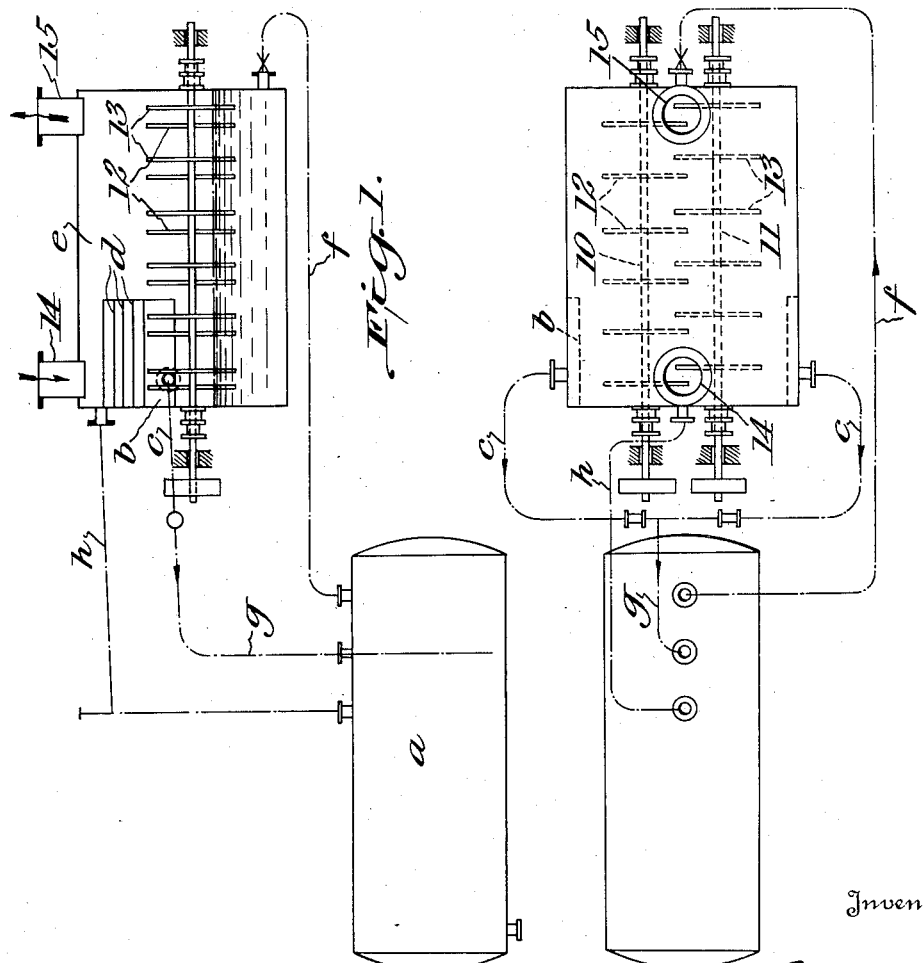
Inventor:
Gustav Rath Patented Sept. 15, 1925.

1,553,718

UNITED STATES PATENT OFFICE.

GUSTAV RATH, OF BARMEN, GERMANY, ASSIGNOR TO FARBENFABRIKEN VORM. FRIEDR. BAYER AND CO., OF LEVERKUSEN, NEAR COLOGNE-ON-THE-RHINE, GERMANY.

GAS-ABSORPTION APPARATUS.

Application filed October 15, 1924. Serial No. 743,815.

*To all whom it may concern:*

Be it known that I, GUSTAV RATH, a citizen of Germany, residing at Barmen, in the State of Prussia, Germany, have invented new and useful Improvements in Gas-Absorption Apparatus, of which the following is a specification.

This invention relates to improvements in or modifications of the apparatus described and claimed in the applications of Eugen Stroder Ser. Nos. 644,232 and 696,040, filed June 8, 1923, and Feb. 29, 1924, respectively.

The specification Ser. No. 644,232 describes apparatus for bringing a gas into intimate contact with a liquid which comprises two parallel shafts, each fitted with a series of disks, the inlet and outlet for the gas being arranged above the disks.

The specification Ser. No. 696,040 describes such apparatus in combination with means whereby sprayed liquid is prevented from returning to the unsprayed liquid.

It is necessary, when simultaneously absorbing and concentrating in one and the same apparatus, that the absorbing medium to be saturated should enter at one side of the apparatus, and when sufficiently concentrated, pass out from the other side.

Should the flow of the gas not take place with regularity, the flow of the liquid through the apparatus must either not be regular, or, if regular, must be pumped through at such speed that the liquid can cope with the greatest flow of the gas which can take place.

In the arrangement shown in the specification Ser. No. 644,232 and Ser. No. 696,040, centrifugal or other pumps must be employed, and this invention has for its object to eliminate these adjuncts which not only give rise to troubles in working but whose consumption of power and cost in maintenance sometimes exceed those of the washing apparatus itself.

According to this invention I provide liquid pockets so situated as to receive liquid sprayed by the rapidly rotating disks and to produce a head of liquid as regards apparatus connected to the absorption apparatus, whereby a circulation of liquid can take place without the employment of special pumps for this purpose.

For a full understanding of the invention reference is made to the accompanying drawings in which—

Fig. 1 is a more or less diagrammatic side elevation of an apparatus embodying the invention;

Fig. 2 is a diagrammatic plan view; and

Fig. 3 is a diagrammatic end view.

In the drawings $a$ is a storage vessel in general and a concentrating vessel in particular, and $e$ a mixing vessel in which a liquid and a gas are brought into intimate contact to promote the absorption of the gas by the liquid. The mixing vessel which is substantially the same as that described in said applications includes two parallel shafts 10 and 11 disposed preferably in the same horizontal plane. On the shafts 10 and 11 are mounted disks 12 and 13, respectively, in staggered relation relatively to each other. Above the shafts and disks is a gas space having an inlet 14 and an outlet 15. As the gas passes through the gas space from one end to the other, the liquid which is thrown off in sheets of finely subdivided particles intercepts the flow of gas without materially impeding its flow. The contact between the liquid in this form and the gas greatly promotes the absorption.

The present invention deals with the problem of circulating the absorption liquid through the mixing vessel $e$ and the concentrating vessel $a$ without special circulating apparatus.

The solution of the problem has been accomplished as follows:

The fluid connection between the concentrating vessel $a$ and the mixing vessel $e$ comprises a conduit $f$ leading from near the top of the former to the bottom portion of the latter, and two branch pipes $c$ leading from opposite sides of the mixing vessel by means of a common pipe $g$ to near the bottom of vessel $a$, a pressure equalizing pipe $h$ serving as a pressure-equalizing conduit between the top of vessel $a$ and the gas space in vessel $e$.

When the system is in normal operating condition the level of the liquid in the mixing vessel $e$ and in the pipes $g$ and $h$ is the same, in accordance with the law of communicating tubes.

Above the level of the liquid in the mixing vessel $e$ are disposed pocket-like receptacles $b$, preferably on both side walls of the vessel. These receptacles serve the purpose to collect part of the liquid thrown out by the disks 12 and 13, at points substantially above the level of the liquid in the vessel and thereby create a head sufficient when imposed upon the circulating system to cause and maintain a flow of liquid between the mixing vessel and the concentrating vessel. The receptacles $b$ are drained by the pipes $c$, previously mentioned. The liquid from the receptacles $b$ flows by gravity into the vessel $a$ through pipes $c$ and $g$. The rate of circulation is therefore proportional to the rate of collection of liquid in the receptacles $b$.

I have found that a sufficient circulation is effected by pockets extending only over a relatively small fraction of the length of the vessel. The rate of circulation may be increased at will to any desired degree within the limits inherent in the character of the apparatus.

For increasing the circulation of liquid through the apparatus, collecting strips $d$ are provided which guide the liquid sprayed by the disks into the pockets.

I claim:

1. The combination with a mixing vessel of the character described, including means for producing a spray of liquid particles in the mixing space of said mixing vessel, of means for circulating liquid through the vessel, said means comprising a storage vessel, means above the level of the liquid in the mixing vessel for collecting liquid particles from the mixing space, a conduit for passing the collected liquid into the storage vessel and a fluid connection from the storage vessel to a point of the mixing vessel below the level of the collecting means.

2. The combination with a mixing vessel including centrifugal means for producing a spray from liquid contained therein, of means for circulating liquid through the vessel, said circulating means comprising means above the level of the liquid in the vessel for collecting at least part of the sprayed liquid, a storage vessel, a conduit for passing the collected liquid into the storage vessel and a fluid connection from the storage vessel to a point of the mixing vessel below the level of the collecting means.

3. A mixing vessel including parallel horizontal shafts, disks thereon, means for rotating the disks, and a housing above the disks defining a mixing space, means on the housing above the disks for collecting liquid thrown off from the disks and a fluid connection from the collecting means to a point in the mixing vessel below the level of the collecting means, said connection including a storage vessel.

4. A mixing vessel including a liquid-containing portion, a housing defining a gas space above the latter, means for producing a spray from liquid contained in the vessel, means on the housing for collecting at least part of the sprayed liquid, a fluid connection from the collecting means to points outside the vessel, the collecting means comprising a pocket-like receptacle extending lengthwise of the housing, a storage vessel disposed below the level of the liquid in the mixing vessel and connected to said fluid connection and a fluid connection from the upper part of the storage vessel to a point in the mixing vessel below the level of the collecting means.

5. A mixing vessel including a liquid-containing portion, a housing defining a gas space above the latter, means for producing a spray from liquid contained in the vessel, means on the housing for collecting at least part of the sprayed liquid a fluid connection from the collecting means to points outside the vessel, the collecting means comprising a pocket-like receptacle extending lengthwise of the housing and collecting strips disposed to guide collected liquid into the receptacle, a storage vessel disposed below the level of the liquid in the mixing vessel and connected to said fluid connection and a fluid connection from the upper part of the storage vessel to a point in the mixing vessel below the level of the collecting means.

In testimony whereof I have hereunto set my hand.

GUSTAV RATH.